3,644,546
REACTION OF A DIALKYL ETHER WITH HCl OR HBr IN THE PRESENCE OF AN ORGANIC ACID
Russell G. Hay, Gibsonia, and John G. McNulty and William L. Walsh, Glenshaw, Pa., assignors to Gulf Research & Development Company, Pittsburgh, Pa.
No Drawing. Filed May 27, 1969, Ser. No. 828,343
Int. Cl. C07c 17/00
U.S. Cl. 260—657                                      12 Claims

ABSTRACT OF THE DISCLOSURE

Increasing the reaction rate of a dialkyl ether with HBr or HCl to produce an alkyl halide which involves carrying out the reaction in the presence of an organic acid having from three to seven carbon atoms.

---

This invention relates to a process for reacting a dialkyl ether with HBr or HCl to obtain a product comprising an alkyl bromide or an alkyl chloride, respectively, and water. It is believed that initially an alkyl halide and an alcohol are formed. The reaction then continues with reaction of the intermediate alcohol with the HBr or HCl to form additional alkyl halide and water. The reaction rate, however, is relatively slow and temperatures required can be relatively high. Under such conditions there is a tendency for a breakdown of alkyl bromide and/or intermediate alcohol to undesirable olefin. We have found that the reaction rate of the process described above can be increased and/or lower temperatures can be employed by the mere expedient of carrying out the reaction in the presence of an organic acid having from three to seven carbon atoms, preferably five carbon atoms.

The primary reactant employed herein is a dialkyl ether which can be defined by the formula $R_1$—O—$R_2$, wherein $R_1$ and $R_2$, the same or different, are alkyl substituents having from one to 20 carbon atoms, preferably from one to 16 carbon atoms, most preferably from one to 12 carbon atoms. Examples of such alkyl substituents are methyl, ethyl, isopropyl, propyl isobutyl, butyl, t-butyl, isoamyl, t-amyl, amyl, isohexyl, t-hexyl, hexyl, isoheptyl, t-heptyl, heptyl, 3-methylhexyl, isooctyl, t-octyl, octyl, 4-methyloctyl, isononyl, t-nonyl, nonyl, isodecyl, t-decyl, decyl, 5-methyldecyl, undecyl, isoundecyl, tridecyl, 3-ethyldodecyl, t-tridecyl, isotridecyl, dodecyl, isododecyl, t-dodecyl, tetradecyl, isotetradecyl, t-tetradecyl, pentadecyl, t-pentadecyl, isopentadecyl, hexadecyl, t-hexadecyl, isohexadecyl, heptadecyl, t-heptadecyl, isoheptadecyl, octadecyl, isooctyldecyl, t-octyldecyl, nonadecyl, isononadecyl, t-nonadecyl, eicosenyl, isoeicosenyl, t-eicosenyl, etc. Specific examples of dialkyl ethers which can be employed include dimethyl ether, dipropyl ether, diisopropyl ether, dibutyl ether, diisobutyl ether, isopropyl-t-butyl ether, diamyl ether, diisobutyl ether, isoamyl-t-butyl ether, dihexyl ether, diisohexyl ether, isohexyl-t-amyl ether, diheptyl ether, diisoheptyl ether, heptyl-isohexyl ether, dioctyl ether, diisooctyl ether, isooctyl-t-heptyl ether, dinonyl ether, diisononyl ether, isononyl-t-octyl ether, didecyl ether 3-ethylhexyl-butyl ether, diisodecyl ether, isodecyl-t-nonyl ether, diundecyl ether, diisoundecyl ether, isoundecyl-t-decyl ether, didodecyl ether, diisododecyl ether, isododecyl-t-undecyl ether, ditridecyl ether, diisotridecyl ether, isotridecyl-t-dodecyl ether, 8-methylhexadecyl-decyl ether, ditetradecyl ether, diisotetradecyl ether, isoteradecyl-tridecyl ether, dipentadecyl ether, diisopentadecyl ether, isopentadecyl-t-tetradecyl ether, dihexadecyl ether, diisohexadecyl ether, isohexadecyl-t-pentadecyl ether, diheptadecyl ether, diisoheptadecyl ether, isoheptadecyl-t-hexadecyl ether, dioctadecyl ether, diisooctadecyl ether, iso-octadecyl-t-heptadecyl ether, 6 - methyldodecyl-amyl ether, dinonadecyl ether, diisononadecyl ether, isononadecyl-t-octadecyl ether, dieicosenyl ether, diisoeicosenyl ether, isoeicosenyl-t-nonadecyl ether, etc.

As noted, the second reactant is HBr or HCl, preferably HBr. Preferably an aqueous solution of HBr or HCl is used. If too much or too little water is present initially with the HBr or HCl there will be a tendency for the desired reaction to slow down. Desirably the aqueous solution of HBr or HCl used should contain from about 15 to about 70, preferably from about 18 to about 48, percent by weight of HBr or HCl.

In order to facilitate the above reaction and/or carry out the same at reduced temperatures the dialkyl ether is reacted with the aqueous HBr or HCl in the presence of an organic acid having from three to seven carbon atoms, preferably five carbon atoms. Examples of such acids are propionic acid, butyric acid, isobutyric acid, valeric acid, isovaleric acid, pivalic acid, caproic acid, isocaproic acid, 2-ethylbutyric acid, heptanoic acid, crotonic acid, isocrotonic acid, vinylacetic acid, ethylacrylic acid, pentenoic acid, angelic acid, tiglic acid, etc.

The reaction can be carried out in any manner that will assure contact between the dialkyl ether and the aqueous HBr or HCl with each other and with the organic acid. The amount of dialkyl ether to aqueous HBr or HCl, on an anhydrous basis, can be, for example, within molar ratios of about 1:1 to about 10:1, preferably about 2:1 to about 4:1. The amount of organic acid used, on a molar basis, relative to the dialkyl ether can, for example, be from about 1:1 to about 10:1, preferably from about 3:1 to about 5:1. The pressure is not critical but is generally sufficient to maintain the reaction mixture in the liquid phase, for example, from about one to about 1000, preferably from about one to about 500, pounds per square inch gauge. A reaction temperature of about 100° to about 250° C., preferably of about 120° to about 200° C., can be used. Reaction time is dependent upon the remaining variables involves herein, but, in general, can be from about one minute to about 40 hours, preferably about 15 minutes to about five hours.

The reaction product will contain unreacted dialkyl ether, HBr and HCl, water, an alkyl halide, and, possibly, some ester and/or olefin and will resolve itself into an upper organic layer and a lower aqueous layer, particularly after the same has been washed with water. The recovery of the desired alkyl halide, or any other component, from the reaction mixture can be effected in any desired manner. Thus, the two layers can be separated from each other by decantation. The aqueous layer will contain HBr or HCl, while the organic layer will contain any unreacted dialkyl ether, alkyl halide, ester and/or olefin that may be present. When $C_3$ or $C_4$ organic acids are used they will be in the aqueous phase, but $C_4$, $C_5$, $C_6$ and $C_7$ organic acids, being less water soluble, will find themselves in varying degrees in the two layers. The desired alkyl halide can be recovered from the organic layer by simple distillation at a temperature, for example, of about 50° to about 300° C. and a pressure of about 20 millimeters of mercury. Since the alkyl bromide or chloride has the lowest boiling point of the components of the organic layer it will come off first under such distillation procedure.

The process can further be illustrated by the following.

EXAMPLE I

There was introduced into a one-liter Morton, three-neck flask, equipped with stirrer, thermometer and water condenser, one mol, on an anhydrous basis, of a 48 percent aqueous solution of HBr, 0.2 mol of di-normal butyl ether and, when used, 0.75 mol of either propionic acid or n-pentanoic acid. The mixture was heated at atmospheric pressure under total reflux and samples were periodically taken and analyzed by gas chromatography. The results obtained are set forth below in Table I.

TABLE I

| Run No. | Time, hours | Temp., °C. | Yield, weight percent of— | | | | | | |
|---|---|---|---|---|---|---|---|---|---|
| | | | n-Butyl bromide with no acid present | n-Butyl bromide with propionic acid present | Butyl ester of propionic acid with propionic acid present | n-Butyl bromide with normal pentanoic acid present | Butyl ester of pentanoic acid with normal pentanoic acid present | n-Butyl bromide with normal nonanoic acid present | Butyl ester of nonanoic acid with nonanoic acid present |
| 1 | 0.5 | 110 | 16.1 | 27.3 | 12.2 | 19.4 | None | 7.5 | None. |
| 2 | 1.0 | 108 | 21.6 | 33.1 | 14.5 | 29.8 | ___do___ | 15.0 | Do. |
| 3 | 2.0 | 106 | 28.0 | 40.1 | 12.9 | 40.8 | ___do___ | 31.4 | Do. |
| 4 | 3.0 | 104 | 31.4 | 44.4 | 14.0 | 48.2 | ___do___ | 33.3 | Do. |
| 5 | 4.0 | 104 | 35.8 | 45.5 | 14.9 | 50.0 | ___do___ | 41.4 | Do. |
| 6 | 5.0 | 103 | 39.3 | 52.9 | 14.9 | 56.3 | ___do___ | 45.7 | Do. |

EXAMPLE II

An additional series of runs similar to those of Example I were made wherein there was used 2 mols, on an anhydrous basis, of 20 percent aqueous HCl and 0.4 mol of dibutyl ether with and without 1.5 mols of propionic acid. The results obtained are tabulated below in Table II.

TABLE II

| Run No. | Time, hours | Temperature, °C. | Yield, weight percent of— | | |
|---|---|---|---|---|---|
| | | | n-Butyl chloride with no acid present | n-Butyl chloride with propionic acid present | Butyl ester of propionic acid with propionic acid present |
| 7 | 0.5 | 175 | 17.0 | 41.8 | 4.0 |
| 8 | 1.0 | 175 | 26.0 | 56.2 | 9.0 |
| 9 | 2.0 | 175 | 33.0 | 70.3 | 12.2 |
| 10 | 3.0 | 175 | 46.0 | 72.3 | 13.3 |
| 11 | 4.0 | 175 | 52.0 | 73.6 | 13.6 |
| 12 | 5.0 | 175 | 59.0 | 81.4 | 12.5 |

The data in Tables I and II clearly illustrate that there is an increase in reaction rate when a dialkyl ether is reacted with aqueous HBr or aqueous HCl in a lower organic acid. Note the appreciable increase in each table when propionic acid is present during the reaction. Although the reaction is accompanied by the formation of an ester when propionic acid is used, the amount thereof appears to stabilize at about 12 to 14 weight percent. Since an ester is a desirable chemical compound such production is commercially attractive. The ester is formed as a result of the reaction of the propionic acid with a fragment of the dialkyl ether. If ester formation is not desired, the reaction can be carried out in the presence of pentanoic acid. This is shown in Table I wherein, unexpectedly, no ester was obtained. When the reaction was carried out in the presence of a C₉ organic acid no appreciable improvement was found.

An additional series of runs (13, 14, 15, 16, 17 and 18), similar to those of Example I, were carried out and the same desirable results were obtained as above. The results are tabulated below in Table III. In Runs Nos. 13, 14 and 15 there was used 1.2 mols, on an anhydrous basis, of 48 percent aqueous HBr and 0.412 mol of di-normal octyl ether. No organic acid was used in the latter runs. However, in Runs Nos. 16, 17 and 18 there was present 1.55 mols of propionic acid, along with 0.942 mol of 48 percent aqueous HBr, on an anhydrous basis, and 0.193 mol of di-normal octyl ether.

TABLE III

| Run No. | Time, hours | Temperature, °C. | Yield, weight percent of— | |
|---|---|---|---|---|
| | | | n-Octyl bromide | Octyl ester of propionic acid |
| 13 | 1.0 | 175 | 16.4 | None. |
| 14 | 3.0 | 175 | 30.0 | Do. |
| 15 | 5.0 | 175 | 39.2 | Do. |
| 16 | 0.5 | 160 | 83.9 | 5.8. |
| 17 | 1.5 | 160 | 86.2 | 7.8. |
| 18 | 2.5 | 160 | 88.2 | 8.0. |

Obviously, many modifications and variations of the invention, as hereinabove set forth, can be made without departing from the spirit and scope thereof, and therefore only such limitations should be imposed as are indicated in the appended claims.

We claim:
1. In a process wherein a dialkyl ether is reacted with a hydrogen halide selected from the group consisting of aqueous HBr and aqueous HCl to produce an alkyl halide, the improvement which comprises carrying out said reaction in the presence of a carboxylic acid having from three to seven carbon atoms selected from the group consisting of propionic acid, butyric acid, isobutyric acid, valeric acid, isovaleric acid, pivalic acid, caproic acid, isocaproic acid, 2-ethylbutyric acid heptanoic acid, crotonic acid, isocrotonic acid, vinylacetic acid ethylacrylic acid, pentenoic acid, angelic acid and tiglic acid in liquid phase under pressure at a temperature of about 100° to about 250° C.

2. The process of claim 1 wherein said carboxylic acid is propionic acid.

3. The process of claim 1 wherein said carboxylic acid is n-pentanoic acid.

4. The process of claim 1 wherein said dialkyl ether is dibutyl ether.

5. The process of claim 1 wherein said hydrogen halide is aqueous HBr.

6. The process of claim 1 wherein said hydrogen halide is aqueous HCl.

7. The process of claim 1 wherein said dialkyl ether is dibutyl ether, said hydrogen halide is aqueous HBr and said carboxylic acid is propionic acid.

8. The process of claim 1 wherein said dialkyl ether is dibutyl ether, said hydrogen halide is aqueous HBr and said carboxylic acid is n-pentanoic acid.

9. The process of claim 1 wherein said dialkyl ether is dibutyl ether, said hydrogen halide is aqueous HCl and said carboxylic acid is propionic acid.

10. The process of claim 1 wherein said dialkyl ether is dibutyl ether, said hydrogen halide is aqueous HCl and said carboxylic acid is n-pentanoic acid.

11. The process of claim 1 wherein said dialkyl ether is dioctyl ether, said hydrogen halide is aqueous HBr and said carboxylic acid is propionic acid.

12. The process of claim 1 wherein said reaction is carried out in a temperature range of about 120° to about 200° C.

References Cited
UNITED STATES PATENTS 2,022,485  11/1935  Whitmore et al. _____ 260—657
2,210,564   8/1940  Andrussow et al. _____ 260—657

DANIEL D. HORWITZ, Primary Examiner